United States Patent
Satani et al.

[11] Patent Number: 5,851,024
[45] Date of Patent: Dec. 22, 1998

[54] SUPPLEMENTAL RESTRAINT SIDE AIR BAG APPARATUS FOR VEHICLE

[75] Inventors: Kenji Satani; Yoshiyuki Iwamoto; Kazuhiro Matsuhashi, all of Hiroshima, Japan

[73] Assignee: Mazda Motor Corporation, Hiroshima, Japan

[21] Appl. No.: 897,981

[22] Filed: Jul. 14, 1997

[30] Foreign Application Priority Data

Jul. 12, 1996 [JP] Japan .................................. 8-183312

[51] Int. Cl.⁶ .................................................. B60R 21/32
[52] U.S. Cl. ...................... 280/730.2; 280/735; 307/10.1
[58] Field of Search ........................ 280/730.2, 730.1, 280/735, 728.2; 180/274, 282; 307/10.1; 340/436

[56] References Cited

U.S. PATENT DOCUMENTS 4,973,859  11/1990  Shodai ...................... 280/735
5,571,253  11/1996  Blackburn et al. ............. 180/282
5,707,076   1/1998  Takahashi ...................... 280/735

FOREIGN PATENT DOCUMENTS 6-64491  3/1994  Japan .

*Primary Examiner*—Paul N. Dickson
*Attorney, Agent, or Firm*—Sixbey, Friedman, Leedom & Ferguson, P.C.; Gerald J. Ferguson, Jr.

[57] ABSTRACT

A side air bag apparatus installed within a seat has an air bag unit containing an inflator and a folded air bag in an air bag unit housing which is connected to a firing control unit by way of a harness partly extending from the air bag unit within and along a lower transverse section of the seat from one side of the seat close to a door to the other side of the seat and partly extending under the seat to the firing control unit via a coupler secured to the underside of the seat.

14 Claims, 10 Drawing Sheets

SUPPLEMENTAL RESTRAINT SIDE AIR BAG APPARATUS FOR VEHICLE

BACKGROUND OF THE INVENTION

1. Field of the Invention

This invention relates to an air bag apparatus as a supplemental restraint air bag apparatus for a vehicle, and, more particularly, to a side air bag apparatus having an air bag unit connected to a firing control device through a harness.

2. Description of Related Art

An air bag apparatus installed in the inside of a steering wheel serves as a supplemental restraint air bag apparatus to protect a driver sitting on the driver's seat and fastened by a seat belt upon an occurrence of a frontal collision. In recent years, in order to protect drivers and/or passengers against side collision, it is becoming widespread to provide a side air bag apparatus with an air bag unit installed in a seat. Such a side air bag apparatus is known from, for example, Japanese Unexamined Patent Publication No. 6-64491.

Air bag unit is typically installed in a side section of a seat close to a side door of the vehicle so as to expand the air bag between the passenger sitting on the seat and the door adjacent to the passenger, protecting a collision of the passenger against the door. In cases where the air bag unit is installed adjacently to the door close to the seat, it is general to lay a harness for transmitting a firing signal from a firing control unit to the air bag unit in the inside of the door. In such a case, because, if the seat is deformed at the side section adjacent to the door due to a lateral collision, the harness is possibly strongly tugged and tensed, there is a strong demand for protection against lateral collision.

SUMMARY OF THE INVENTION

It is accordingly an object of the invention to provide a side air bag apparatus installed within a seat of a vehicle as a supplemental restraint system in which an air bag unit is connected to a firing control unit by way of a harness free from tension even when the seat is deformed upon an occurrence of a lateral collision of the vehicle.

The above object of the invention is accomplished by providing a side air bag apparatus installed as a supplemental restraint system within a seat of a vehicle which comprises an air bag unit installed within a side section of a seat close to a vehicle door and a firing control device disposed separately from the air bag unit and the seat for generating a firing signal in response to a lateral collision of the vehicle. A harness through which a firing signal is transmitted to the firing control device, in particular a inflator within the air bag unit, from the firing control unit is laid to partly extend within the seat in a transverse direction of the vehicle from the air bag unit toward a center of the vehicle.

The air bag unit may be installed within a side section, such as a bolster, of a seatback or a seat cushion of the seat. In the case where the air bag unit is installed within the seatback, the harness extends within the seatback downward from the air bag unit and then toward an opposite side section remote from the vehicle door along a lower section of the seatback. A coupler may be attached to a front underside of a seat cushion of the seat which coupler connects a part of the harness extending from the air bag unit and a part of the harness extending to the firing control unit. The harness may be laid and extends along a lower transverse section extending along the lower section of the seatback of a seatback frame member as a seatback reinforcement. Further, the harness may be partly attached to a transverse member disposed within the seatback and extending along the lower transverse section of the seatback frame member.

With the side air bag apparatus as a supplemental restraint system according to the invention, the harness laid to partly extend within the seat in a transverse direction of the vehicle from the air bag unit toward the center of the vehicle is adapted to loosen as the seat is deformed due to a lateral collision of the vehicle. Accordingly, the harness is prevented from receiving tension, and hence put under well protection. Furthermore, because the air bag unit is installed within the seatback bolster, or the seat cushion bolster, of the seat which provides a relatively large space, the air bag unit is installed in the seat without an effect of losing a pleasant sitting feeling. In addition, because the harness partly extending from the air bag unit and partly extending from the left firing control unit is connected by means of the coupler secured to the front underside of the seat cushion, it is made possible to prepare the seat with the harness and the coupler connected to the harness and secured to the seat cushion in advance, and to connect the harness extending from the firing control unit to the coupler during installing the seat into the vehicle. The harness extending from the firing control unit is quite easily connected to the coupler. The coupler secured to the underside of the seat cushion is hard to be kicked and significantly damaged by a foot of the passenger sitting on the rear seat. This layout of the harness not only provides improved convenience of assembling the harness and the coupler to the seat and installing the seat into the vehicle but also put the harness and the coupler under improved protection.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
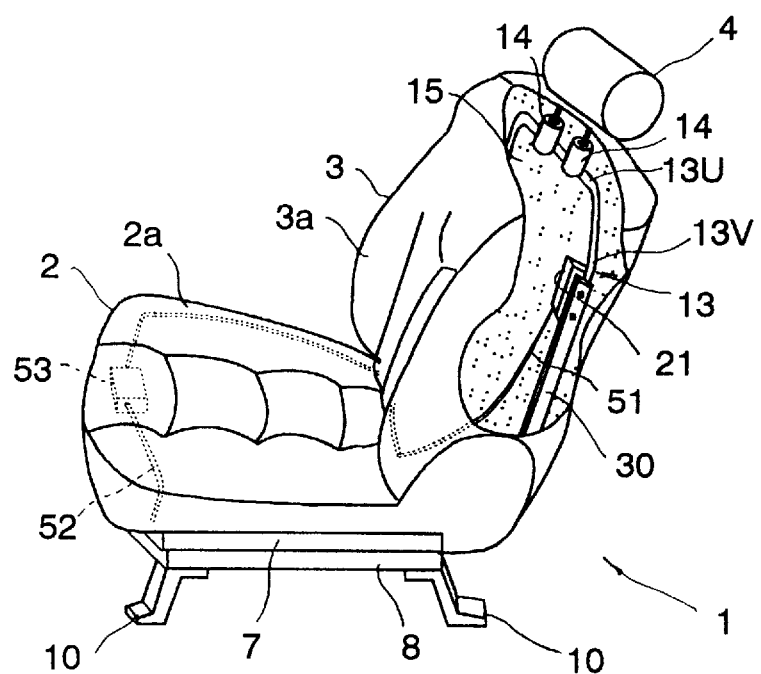
FIG. 1 is a perspective view, partly in broken, of a seat in which an air bag apparatus in accordance with an embodiment of the invention is installed.
Figure 2:
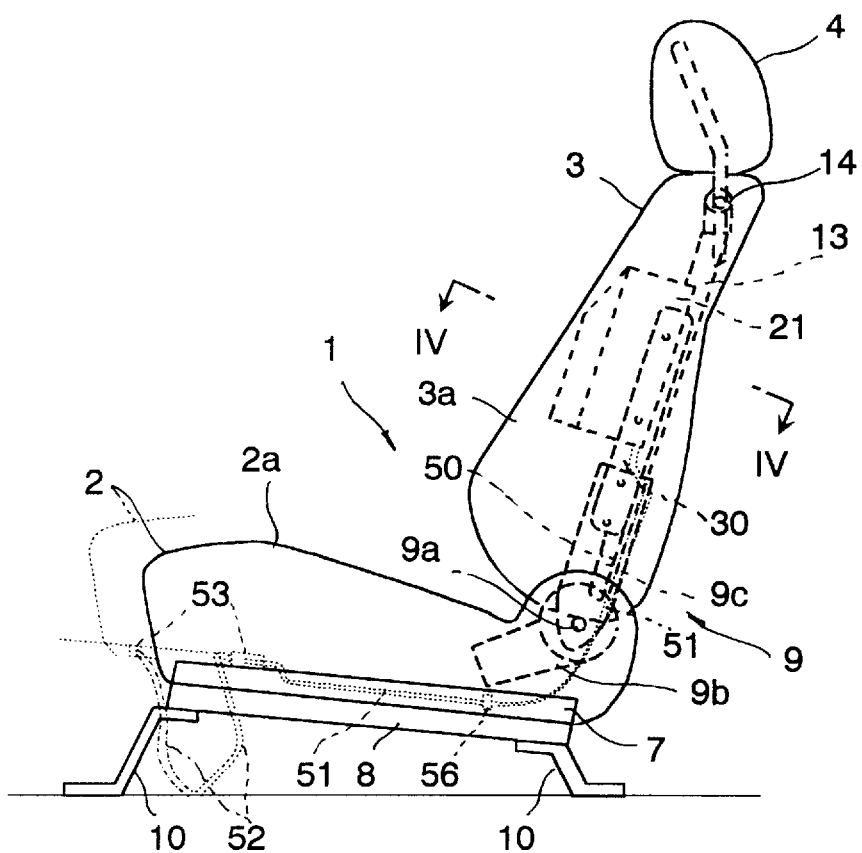
FIG. 2 is a side view of the seat shown in FIG. 1.

Referring to the drawings in detail, particularly to FIGS. 1 and 2 which show, by way of example, a front left passenger's seat 1 with an side air bag apparatus installed therein. The seat 1 comprises a seat cushion 2, a seatback 3 and a head restraint 4. The seat cushion 2 at each of the opposite sides is provided with a slider bar 7 secured to the under side thereof. The slide bars 7 are put on a pair of parallel guide rails 8 for slide movement in a longitudinal direction from front to back of a vehicle and locked to adjust the seat 1 in a desired longitudinal position. Each side rail 8 at its front and rear ends is secured to a floor panel (not shown) by means of brackets 10. A knuckle mechanism 9 connects these seat cushion 2 and seatback 3 so that the seatback 3 is folded and unfolded between a flat position and an upright position. The seatback angle is changed by means of a seatback angle adjustment mechanism (not shown). The knuckle mechanism 9 comprises a bracket 9a secured to each rear end of the seat cushion 2, a transverse hinge shaft 9b supported by the brackets 9a, and a knuckle arm 9c secured to each side of the seatback 3. The head restraint 4 has a generally U-shaped frame 5 having a pair of pipe-shaped guide legs 5a which extend out of the head restraint 4 and are received by a head restraint vertical adjustment cylinders 14 for vertical position adjustment. The head restraint 4 is pulled up to be raised or pushed down to be lowered. The seatback 3 at its rear section is encircled and reinforced by a rectangularly-shaped seatback frame member 13 made of a steel pipe. The seatback frame member 13 is shaped to conform to the shape of the seatback 3. One of the vertical side sections 13V extends along the left side of the seatback 3. The seatback frame member 13 at its upper transverse section 13U securely supports the head restraint vertical adjustment cylinders 14.

Figure 3:
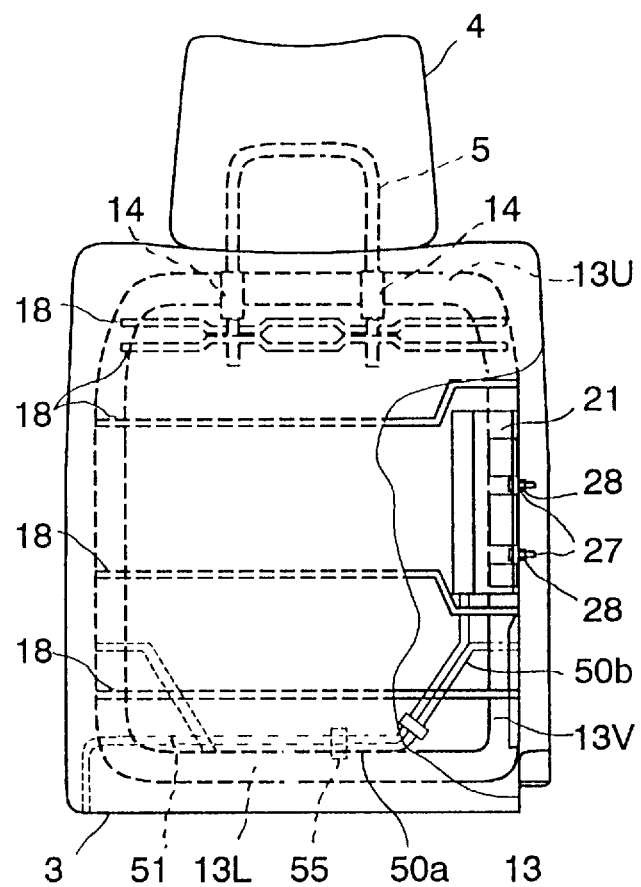
FIG. 3 is a top view, partly in broken, of a seatback of the seat.
Figure 4:
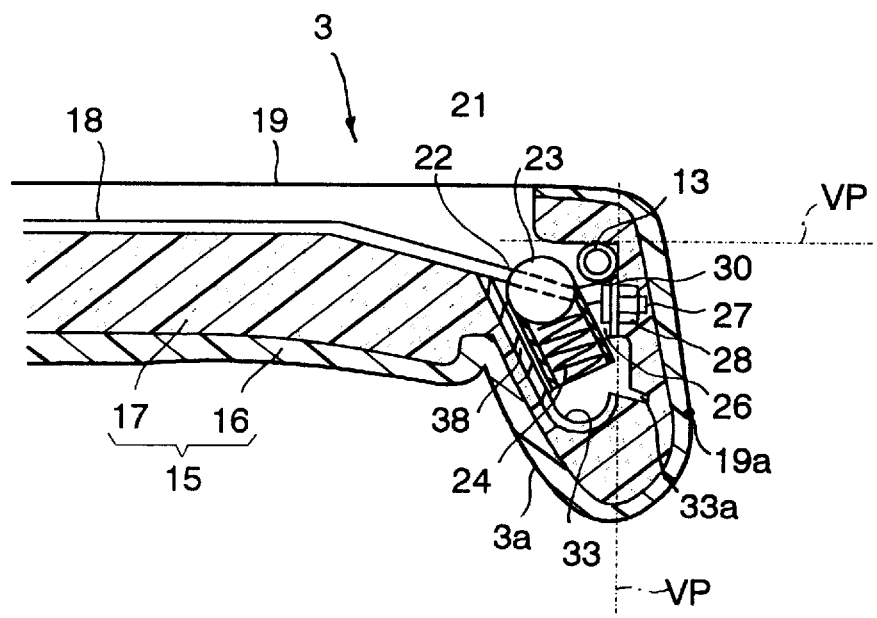
FIG. 4 is a cross-sectional view of an essential part of the seatback taken along line IV—IV of FIG. 2.

As clearly shown in FIGS. 3 and 4, the seatback 3 is provided with a plurality of, for example five in this embodiment, wire strings 18 transversely extending between and welded, or otherwise secured, to side vertical sections 13V of the seatback frame member 13. This wire string 18 has a diameter smaller than that of the steel pipe of the seatback frame member 13. A seatback pad 15 is supported in such a way as to hold the seatback frame member 13 at the rear side sections from the side to the back. The wire strings 18 bears up the seatback pad 15 so as to prevent the seatback pad 15 from sinking backward when the person sitting on the seat 1 leans against the seatback 3. The seatback pad 15 comprises an urethane foam core pad 17 and an urethane foam cover pad 16 softer than the urethane foam core pad 17. The seatback 3 at its back is empty behind the wire strings 18 and covered by a thin outer cloth cover 19.

As seen in FIG. 1, the seat cushion 2 has a seat cushion side bolster 2a swelled upward at each side, and the seatback 3 has a side bolster 3a swelled forward at each side.

Figure 6:
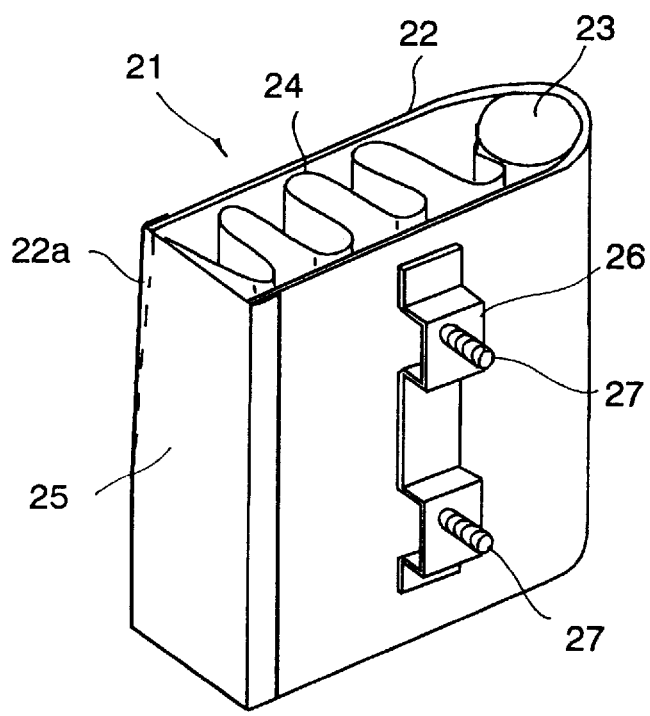
FIG. 6 is an explanatory view showing an air bag unit.

Seat 1 is provided with an air bag unit 21 installed within one of the seatback side bolsters 3a of the seatback 3, which is adjacent directly to a left door 40 (see FIG. 7) of the vehicle, for holding the passenger sitting on the seat 1. The air bag unit 21 is positioned in close proximity to the side vertical section 13V of the seatback frame member 13. As shown in FIG. 6, the air bag unit 21 comprises a unit housing 23 having a U-shaped cross-section and serving as a reaction can, a hollow cylinder inflator 23 containing firing mechanism and an explosive (both not shown) therein, and a folded air bag 24. The front opening 25 of the unit housing 23 is closed by paper. A first harness 51 extends from the firing mechanism to a left side air bag firing control unit 61 connected to a lateral acceleration sensor (not shown). When the firing control unit 61 sends a firing signal to the firing mechanism of the inflator 23 in response to detection A of a lateral collision of the vehicle by the lateral acceleration sensor, the inflator 23 fires the explosion to produce and blows a large amount of gas by which the air bag 24 is instantaneously inflated and expanded forward tearing the papered front opening 25 of the unit housing 22.

Unit housing 22 has front verges 22a, the inner or right one of which is formed with an upper half section sloped backward. The air bag unit 21 is installed within a space 33 formed in the inside of the left seatback side bolster 3a of the seatback pad 15. Specifically, the air bag unit 22 is placed in such a position as to put the inflator 23 in close proximity to the left side vertical section 13V of the seatback frame member 13 and direct the papered front opening 25 forward left. The entire air bag unit 21 is in the inside space defined by vertical planes VP perpendicularly intersecting to each other and externally contact with the outer surface of the left side vertical section 13V of the seatback frame member 13. Further, the air bag unit 22 is declined upward with respect to the floor of the vehicle so as to direct the papered front opening 25 slightly upward with respect to a horizontal plane when the seatback 3 is adjusted with respect to the seat cushion at a regular angle appropriate for the passenger sitting on the seat 1. The space 33 is specifically defined by an inner wall 33a in the left seatback side bolster 3a. In the space 33, a bracket frame 30 extends along and secured to the left side vertical section 13V of the seatback frame member 13 from the inside. On the other hand, the air bag unit 21 is provided with a pair of fitting staples 26 welded, or otherwise secured, to the side wall of the unit housing 22. The air bag unit 21 is bolted by fixing bolts 27 and 28 and nuts, or otherwise secured, to the bracket frame 30. In such a way, the air bag unit 21 is rigidly supported by the seatback frame member 13. The bracket frame 30 at its lower end is bolted, or otherwise secured, to the knuckle arm 9c of the knuckle mechanism 9 installed in the seat 1. The seatback pad 15 is formed with an vertical notch 33b or a vertical groove in the inner wall 33a facing the papered front opening 25 of the unit housing 22 of the air bag unit 21 placed in the space 33. This vatical notch 33b faces directly the papered front opening of the unit housing 22 of the air bag unit 21 and has a vertical length slightly longer or approximately equal to the length of the unit housing 22 of the air bag unit 21. Further, the seatback pad 15 has a seam 19a on the horizontal extension of the vertical notch 33b and formed in the outer cloth cover 19. Part of the seatback pad 15 thus structured is easily torn and broken starting the vertical notch 33b toward the seam 19a as expansion of the air bag 24 progresses, and finally opens along the seam 19a to permits the air bag 24 still expanding to jut out of the seatback 3 through the opening. The urethane foam core pad 17 along the space 33 which faces the air bag unit 21 is provided with a felt pad 38 integrally secured thereto. The utilization of the felt pad 38 prevents part of the urethane foam cover pad 17 from flying off when it is shaved off due to expansion of the air bag 24 and prevents dins caused due to a rub between the air bag unit 21 and the urethane foam core pad 17 of the seatback pad 15.

Figure 5:
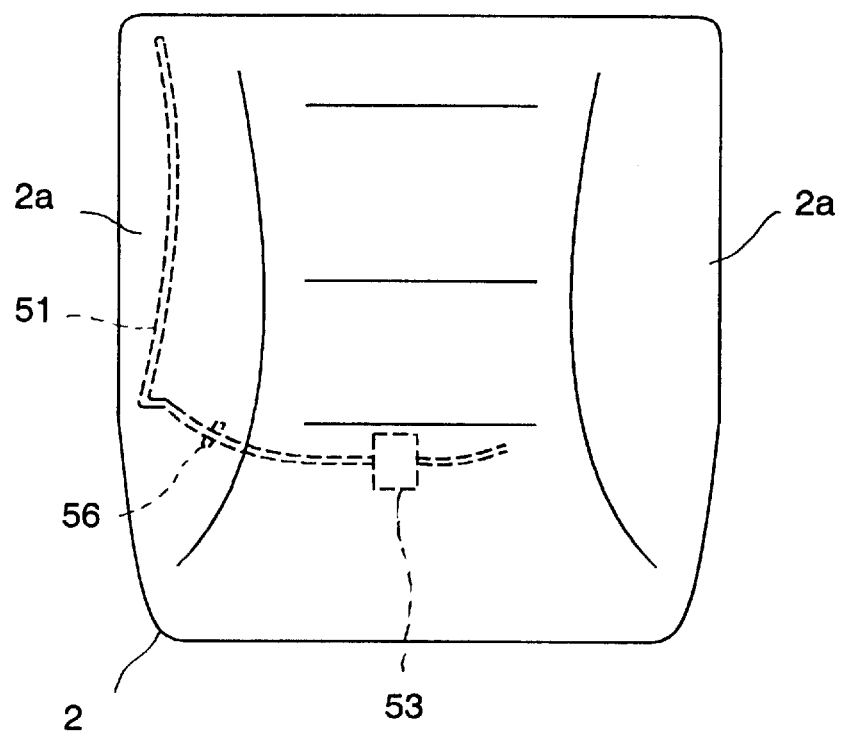
FIG. 5 is a top view of seat cushion of the seat.

As seen in FIGS. 2 and 3, a harness fitting member 50 is installed within the lower section of the seatback 3. This harness fitting member 50 has a middle section 50a and opposite side sections 50b. The middle section 51a of the harness 51 extends along the lower transverse section 13L of the seatback frame member 13. Each side section 50b of the harness fitting member extends upward and outward and is secured to the side vertical section 13V of the seatback frame member 13 at appropriated height. The first harness 51 extends downward along the side section 50b of the harness fitting member 50 from inflator 23 of the air bag unit 21 and then transversely along the middle section 50a. As seen in FIG. 3, the first harness 51 at its middle and opposite end sections is fastened to the harness fitting member 50 by means of fastening plastic bands 55. The first harness 51 further extends downward at the right side end of the seatback 3 and enters into the seat cushion 2. As shown in FIG. 5, within the seat cushion 2, the first harness 51 extends forward along the right side slider bar 7 and then turns inward at the front end of the seat cushion 2 to a coupler 53 secured to the under side of the seat cushion 2 at a transversely middle position. At the coupler 53 couples the first harness 51 and a second harness 52 extending another firing control unit (not shown) for the right side air bag. The first harness 51 is secured to the underside of the seat cushion 2 and the right side slider bar 7 by means of plastic clips 56 as seen in FIG. 2.

Second harness 52, connected to the coupler 53 at opposite side to the first harness 51, extends toward the vehicle floor under the seat cushion 2 and creeps to the firing control unit for the right side air bag unit. In this instance, the second harness 52 has a sufficient length so as to have much slack between the coupler 53 and the vehicle floor, and to have no tension, even when the passenger's seat 1 is adjusted to its forward end position.

Figure 7:
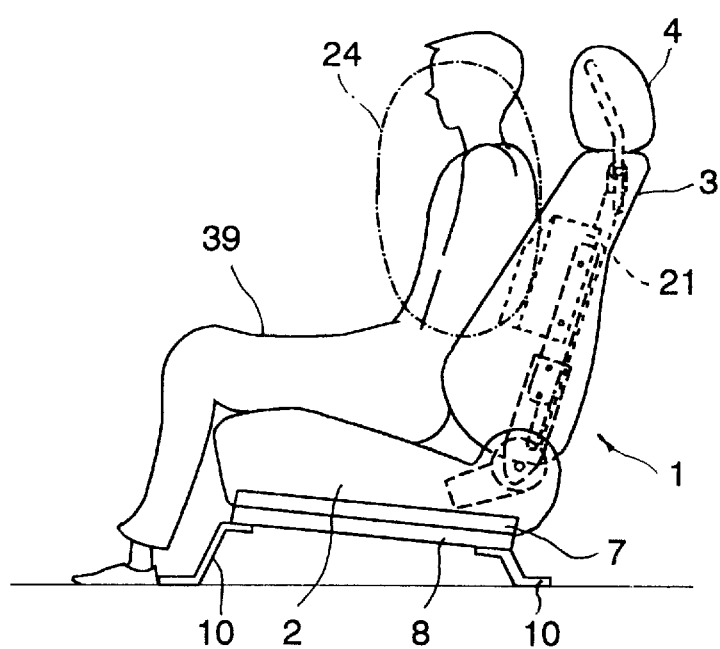
FIG. 7 is an explanatory side view showing an expanded air bag.
Figure 8:
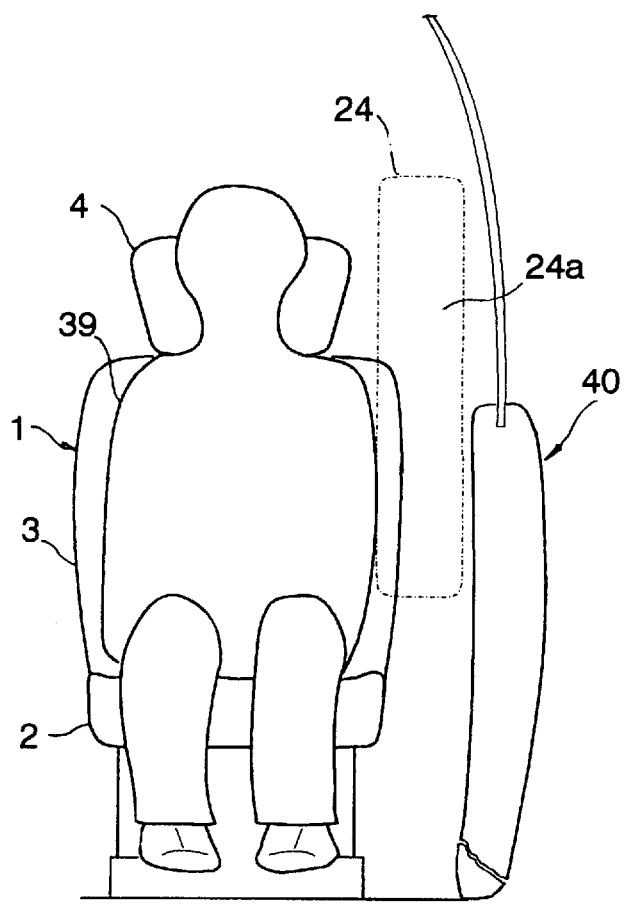
FIG. 8 is an explanatory front view showing the expanded air bag.

As shown in FIG. 7 and 8, the air bag 24 expands vertically in a fashion of a generally rectangularly-shaped balloon between the left door 40 and the passenger 39 sitting on the seat 1 so as to extend over the upper body and the head of the passenger 39 sitting on the seat 1.

Figure 9:
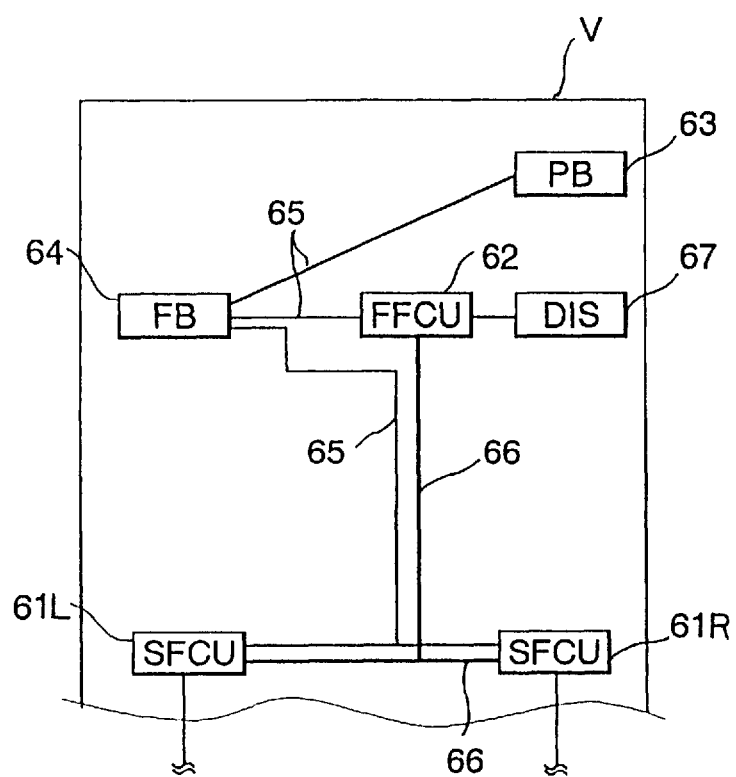
FIG. 9 is a block diagram showing wiring of the air bag apparatus.

FIG. 9 diagrammatically shows the total system of air bag apparatus installed in the vehicle. The vehicle V is provided with left and right side air bag apparatuses and a front air bag apparatus. The left and right side air bag apparatuses are independently controlled to be fired by the left and right firing control units (SFCU) 61L and 61R. Similarly, the front air bag apparatus is controlled to be fired by the front firing control unit (FFCU) 62 upon an occurrence of a frontal collision of the vehicle V. These side air bag firing control units (SFCU) 61L and 61R are installed near the front seats placed side by side. The front air bag firing control unit (FFCU) 62 is at a transversely center position in the front section of the vehicle. All these air bag firing control units (SFCU and FFCU) 61L, 61R and 62 are supplied with electric power from a battery (PB) 63 through power lines 65 via a fuse box (FB) 64. One of the power lines 65 extends to the right from the fuse box 64 and turns backward between the seats. The power line branches off into two branch lines and extend opposite directions to the respective side air bag firing control units (SFCU) 61L and 61R. The front and side air bag firing control units (FFCU and SFCU) 62, 61L and 61R are connected to one another by way of intercommunication lines 66. Diagnostic data of faults is sent to and gathered at the front air bag firing control unit 62 from the side air bag firing control units (SFCU) 61L and 61R. If there is a fault at any one of the side air bag firing control units (SFCU) 61L and 61R, the front air bag firing control unit (FFCU) 62 excites a warning lamp (WP) 67 to indicate the fault. The power lines 65 and intercommunication line 66 are bundled compactly.

In operation of the side air bag apparatus of the embodiment as described above, in response to a firing signal generated by the lateral acceleration sensor upon an occurrence of a left side lateral collision of the vehicle, the left side air bag firing control unit (SFCU) 61L produces a firing signal and sends it to the firing mechanism of the inflator 23 through the second harness 52 and the first harness 51 via the coupler 53. The firing mechanism fires the explosion in the inflator 23 to produce and blow a large amount of gas into the air bag 24. As a result, the air bag 24 is rapidly inflated and expanded by the gas to tear the part of the seatback pad 15 at the vertical notch 33b. With rapid progress of expansion of the air bag 24, the part of the seatback pad 15 is torn and broken toward the seam 19a of the outer cloth cover 19 and finally opens the outer cloth cover 19 along the seam 19a, permitting the air bag 24 still inflating and expanding to jut out from the seatback 3 and extend between the left door 40 and the passenger 39 sitting on the seat 1.

In this instance, because of the wiring where the first harness 51 extends downward from the air bag unit 21 and then from the left side to the right side of the lower section within the seatback 3, the first harness 51 is prevented from loosing and being applied with tension even upon an occurrence of deformation of the seat cushion 2 and/or the seatback 3 due to a lateral collision of the vehicle V. Furthermore, because the first harness 51 creeps the lower of the seatback 3, the first harness 51 does not receive an external force from the seatback 3 even when the passenger sitting on the seat 1 leans on the seatback 3. In this way, the first harness 51 is not only well protected as usual but prevented from significant damages due to a lateral collision of the vehicle. Furthermore, because the power line 65 between the fuse box 64 and the left and right side air bag firing control units (SFCU) 61L and 61R and the intercommunication line 66 between front and left side air bag firing control units (FFCU and SFCU) 62 and 61 extend as a bundle along the lengthwise center line of the vehicle, these lines 65 and 66 are certainly prevented from snapping.

Figure 10:
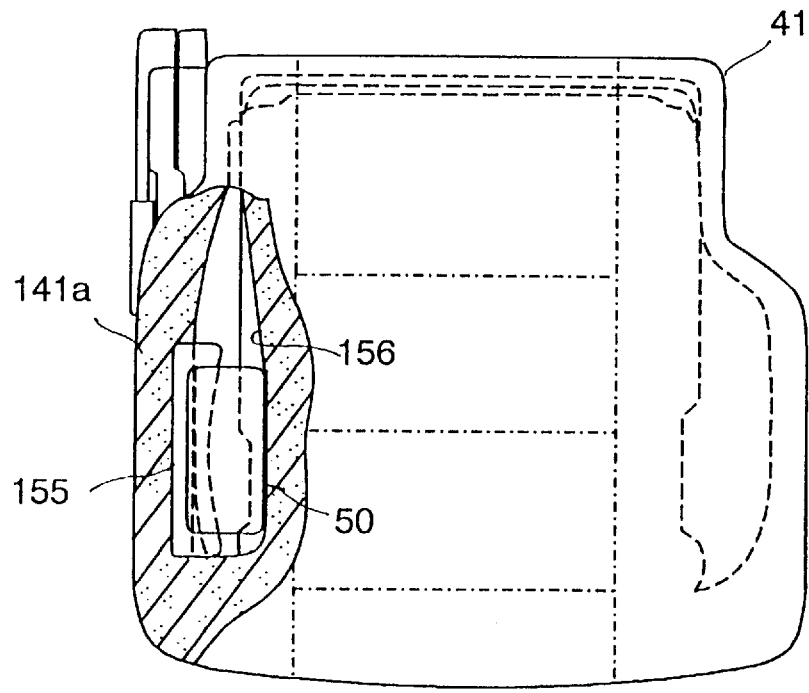
FIG. 10 is a top view of a seat cushion in which an air bag apparatus in accordance with another embodiment of the invention is installed.
Figure 11:
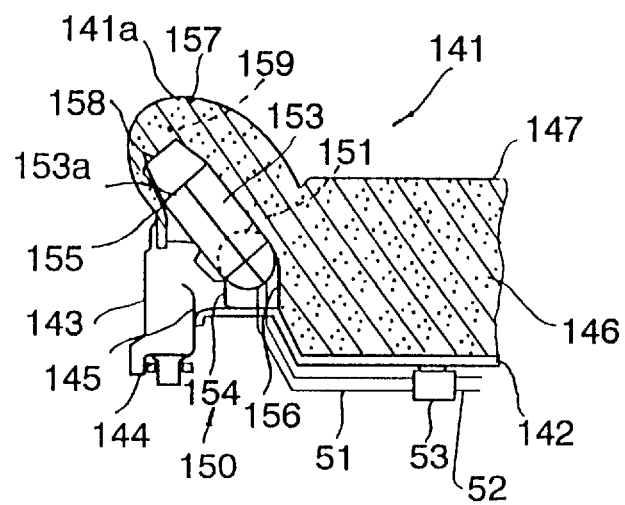
FIG. 11 is a front view, partly in broken, of an essential part of the seat cushion.

FIGS. 10 and 11 shows an air bag apparatus installed as a supplemental restraint system for a driver in accordance with another embodiment of the invention. A driver's seat similar to the passenger's seat 1 has a seat cushion 102 comprising a cushioning pad 164, a plate-like seat cushion frame 142 onto which the cushioning pad 146 is attached, a side garnish 143 secured to each side of the seat cushion frame 142, and a slider bar 145 interposed between the seat cushion frame 142 and the side garnish 143 at each side of the seat and slidable on a guide rail 144 disposed on the vehicle floor (not shown). The cushioning pad 146 is enclosed by an outer cloth cover 147. The seat 141 at each of its sides is formed with a seat cushion side bolster 141a swelled upward. An air bag unit 150 is installed within a space formed in the right side bolster 141a. This air bag unit 150 is similar in structure and operation to that shown in FIG. 6 and comprises an air bag unit housing 153 having a U-shaped cross-section and serving as a reaction can, a hollow cylinder inflator 151 containing a firing mechanism and an explosive (both not shown) therein, and a folded air bag (not shown). The front opening 153a of the unit housing 153 is closed by paper. The air bag unit housing 153 is bolted, or otherwise secured, to the seat cushion frame 142 by means of a fitting bracket 154. A deflector 155 made of a thin steep plate is secured to the fitting bracket 154 and the air bag unit housing 153 so as to direct the air bag upward and slightly backward. The space 156 formed in the right side bolster 141a extends gradually narrowing backward so as to make the air bag expand easily backward. Part of the cushioning pad 146 facing the papered front opening 153a is formed with a vertical notch or vertical groove line 158 along which the cushioning pad 146 is easily broken, and the outer cloth cover 147 at that part is provided with a seam 157 along which the outer cloth cover 147 is torn by the air bag inflating and expanding. Accordingly, with progress of inflation and expansion of the air bag, the part of the cushioning pad 146 is opened along the weakened line and the seam 157 to permit the air bag to jut out of the seat cushion 411.

A first harness 51 extending from the air bag unit 150 is connected to a coupler 53 secured to the underside of the seat cushion 141, and a second harness 52 extends from the coupler 153 to a firing control unit 61.

As described above, with the air bag unit 21 installed in the seatback bolster 3a of the seat 1 adjacent to the left door, since the first harness 51 extends vertically downward from the air bag unit 21 and then transversely to the right within the seatback 3, the first harness 51 is prevented from being applied with tension even upon an occurrence of deformation of the seat 1 due to a lateral collision of the vehicle V. Furthermore, because the air bag unit 21 is installed within the seatback bolster 3a of the seat 1 which provides a relatively large space, the seat 1 does not loose a pleasant sitting feeling.

In addition, because the first harness 51 extending from the air bag unit 21 and the second harness 52 extending from the left side air bag firing control unit (SFCU) 61 are bundled by means of the coupler 53 secured to the front underside of the seat cushion 2, it is made possible to prepare the seat 1 with the first harness 51 and the coupler 53 connected to the first harness 53 and secured to the seat cushion 2 and connect the second harness 52 extending from the left side air bag firing control unit (SFCU) 61 to the coupler 53 during installing the seat 1 into the vehicle. Because the coupler 53 is secured to the underside of the seat cushion 2, It is quite easy to connect the second harness 52 to the coupler 53. The coupler 53 secured to the underside of the seat cushion 2 is prevented from being kicked and significantly damaged by a foot of a passenger sitting on the rear seat. This arrangement not only provides improved convenience of assembling the first and second harnesses 51 and 52 and the coupler 53 to the seat 1 and installing the seat 1 into the vehicle but also put the first and second harnesses 51 and 52 and the coupler 53 under improved protection.

Air bag unit 21 may be installed in a left side bolster 2a of the left seat 1. In this instance, the air bag unit 21 is placed so as to direct the papered front opening 25 approximately upward, and the first harness 51 is connected to the coupler 53 after laying the first harness 51 from the air bag unit 21 to the right in the seat cushion 2.

It is to be understood that the present invention may be embodied with various changes, modifications and improvements, which may occur to those skilled in the art, without departing from the spirit and scope of the invention defined in the following claims.

What is claimed is:

1. A side air bag apparatus installed as a supplemental restraint system installed within a seat of a vehicle, which comprises:

an air bag unit installed within a side section of the seat close to a vehicle door and comprising an air bag unit housing having an opening directed in a specified direction, an air bag folded within said air bag unit housing and an inflator having an explosive and firing means for firing said explosive to produce and blow gas into said air bag to inflate, expand and thrust out said air bag through said opening of said air bag unit housing upon an occurrence of a lateral collision of the vehicle;

a firing control device disposed separately from the seat for generating a firing signal in response to said lateral collision; and a harness partly extending in a transverse direction of the vehicle from said air bag unit toward a center of the vehicle within the seat for transmitting said firing signal to said firing means from said firing control device.

2. An air bag apparatus as defined in claim 1, wherein said air bag unit is installed within a side section of a seatback of the seat close to a vehicle door.

3. An air bag apparatus as defined in claim 2, wherein said harness extends within said seatback downward from said air bag unit and then toward a side section of said seatback remote from said vehicle door along a lower section of said seatback.

4. An air bag apparatus as defined in claim 3, and further comprising a frame member within said seatback along which said harness extends, said frame member having at least a transverse lower section extending along said lower section of said seatback.

5. An air bag apparatus as defined in claim 4, and further comprising a transverse member, disposed within said seatback and extending along said transverse lower section of said frame member, along which said harness extends and to which said harness is partly attached.

6. An air bag apparatus as defined in claim 1, wherein said air bag unit is installed within a side section of a seat cushion of the seat close to a vehicle door.

7. An air bag apparatus as defined in claim 1, and further comprising coupling means attached to a front underside of a seat cushion of the seat for connecting a part of said harness extending from said air bag unit and a part of said harness extending to said firing control device.

8. An air bag apparatus as defined in claim 7, wherein said coupling means is positioned between slider members at opposite sides of the seat for adjusting the seat in lengthwise position relative to the vehicle.

9. An air bag apparatus as defined in claim 2, and further comprising coupling means attached to a front underside of a seat cushion of the seat for connecting a part of said harness extending from said air bag unit and a part of said harness extending to said firing control device.

10. An air bag apparatus as defined in claim 9, wherein said coupling means is positioned between slider members at opposite sides of the seat for adjusting the seat in lengthwise position relative to the vehicle.

11. An air bag apparatus as defined in claim 3, and further comprising coupling means attached to a front underside of a seat cushion of the seat for connecting a part of said harness extending from said air bag unit and a part of said harness extending to said firing control device.

12. An air bag apparatus as defined in claim 11, wherein said coupling means is positioned between slider members at opposite sides of the seat for adjusting the seat in lengthwise position relative to the vehicle.

13. An air bag apparatus as defined in claim 4, and further comprising coupling means attached to a front underside of a seat cushion of the seat for connecting a part of said harness extending from said air bag unit and a part of said harness extending to said firing control device.

14. An air bag apparatus as defined in claim 13, wherein said coupling means is positioned between slider members at opposite sides of the seat for adjusting the seat in lengthwise position relative to the vehicle.

* * * * *